United States Patent [19]

Lühmann

[11] Patent Number: 5,725,923
[45] Date of Patent: Mar. 10, 1998

[54] USE OF A STRIP OF SELF-ADHESIVE FILM FOR TEMPORARY BONDS

[75] Inventor: Bernd Lühmann, Norderstedt, Germany

[73] Assignee: Beiersdorf Aktiengesellschaft, Hamburg, Germany

[21] Appl. No.: 339,528

[22] Filed: Nov. 15, 1994

[30] Foreign Application Priority Data

Nov. 20, 1993 [DE] Germany .................. 43 39 604.6

[51] Int. Cl.⁶ .......................................... C09J 7/02
[52] U.S. Cl. .................. 428/40.1; 206/411; 428/41.7; 428/41.8; 428/194; 428/202; 428/212; 428/214; 428/354
[58] Field of Search .................. 428/40, 41, 42, 428/43, 131, 137, 138, 192, 194, 195, 202, 201, 212, 214, 354; 206/411

[56] References Cited

U.S. PATENT DOCUMENTS

| | | | |
|---|---|---|---|
| 2,292,024 | 8/1942 | Dreher | 428/354 |
| 2,565,509 | 8/1951 | Marcin | 428/354 |
| 2,721,810 | 10/1955 | Schram | 428/354 |
| 3,203,823 | 8/1965 | Grimes | 428/354 |
| 3,257,677 | 6/1966 | Batchelder | 428/354 |
| 4,348,440 | 9/1982 | Kriozere | 428/41 |
| 4,413,080 | 11/1983 | Blake | 524/187 |
| 4,569,960 | 2/1986 | Blake | 524/145 |
| 5,229,447 | 7/1993 | Miyajima et al. | 524/377 |
| 5,242,726 | 9/1993 | Pariseau et al. | 428/40 |

FOREIGN PATENT DOCUMENTS

| | | |
|---|---|---|
| 0160154 | 11/1985 | European Pat. Off. |
| 0141504 | 5/1987 | European Pat. Off. |
| 0361215 | 4/1990 | European Pat. Off. |
| 0513719 | 11/1992 | European Pat. Off. |
| 0532013 | 3/1993 | European Pat. Off. |
| 0554106 | 8/1993 | European Pat. Off. |
| 0555772 | 8/1993 | European Pat. Off. |
| 1719882 | 11/1955 | Germany . |
| 3124815 | 1/1983 | Germany . |
| 3331016 | 10/1984 | Germany . |
| 3407279 | 8/1985 | Germany . |
| 3906120 | 8/1990 | Germany . |
| 4222849 | 6/1993 | Germany . |
| 510103 | 8/1971 | Switzerland . |
| 9211333 | 7/1992 | WIPO . |
| 9306182 | 4/1993 | WIPO . |
| 9306184 | 4/1993 | WIPO . |

*Primary Examiner*—Nasser Ahmad
*Attorney, Agent, or Firm*—Sprung Kramer Schaefer & Briscoe

[57] ABSTRACT

Piece of adhesive film for a temporary bond,
 a) comprising a double-sided adhesive film
 b) whose adhesive surfaces have been rendered non-adhesive in areas lying opposite one another in an offset manner, where
 c) the non-adhesive areas only overlap slightly, or not at all, and
 d) the adhesive bond produced therewith can be separated by pulling apart the non-adhesive areas, in particular by pulling in the direction of the bond plane.

10 Claims, No Drawings

USE OF A STRIP OF SELF-ADHESIVE FILM FOR TEMPORARY BONDS

The invention relates to a piece, i.e. tape or plaster, of adhesive film for a temporary bond.

Adhesive films of this type are known. For example, DE 33 31 016 A1 describes an adhesive film for temporary adhesive bonds which allows an adhesive bond produced therewith to be separated by pulling on the adhesive film in the direction of the bond plane. By means of adhesive films of this type, high adhesive forces and shear strengths can be achieved and adhesive bond systems can be separated again without further aids, in comparable manner to the opening of a preserving jar, where the rubber seal is pulled out of the sealing join via the tab.

Furthermore, DE 37 14 453 C1 describes a practice explosive charge which is reversibly attached to a practice object by means of an adhesive film of this type and can be removed from the practice object in a non-destructive manner.

Furthermore, WO 92/11333 describes, inter alia, adheive films for corresponding applications, where the adhesive films employed have low elasticity at the same time as high elongation.

DE 42 22 849 C1 likewise describes a strip of adhesive film of this type with a specially designed tab.

However, the adhesive systems described in the above patent specifications also have a number of disadvantages:

- In order to be able to remove the adhesive film from the bond join, part thereof must project therefrom in the form of a tab. The adhesive film is thus necessarily not completely invisible in the case of the bonding of inflexible objects, but rather the tab is visible, which can appear visually disadvantageous and can also result in technical problems when materials which age on exposure to light are used.
- During bonding, the entire adhesive film, i.e. including the tab, can easily disappear into the bond join. This can happen, particularly to the inexpert user, if he does not place a piece of adhesive film of this type on the edge of the substrate in such a way that a tab sticks out and then projects out of the bond join. It is then hard to know what to do to release the bond, and destruction, at least of one substrate, can be the consequence.
- If the adhesive films tear during the release process and a torn piece of adhesive film remains completely inside the bond join, separation of the bonded materials without leaving a residue and without destruction of the bond partners is usually no longer possible, which can cause considerable damage.
- It is not possible to use layers which can only be stretched a small amount, or not at all, as a constituent of the adhesive films. However, corresponding layers, for example foams, can be decidedly valuable constituents from the technical point of view, for example to achieve good bond strength on rough substrates.

The object of the present invention was to provide adhesive films for temporary bonds which are totally within the region of the bond joint after bonding, i.e. are "invisible" but which nevertheless preferably allow separation of the bonded objects in a simple manner without damage and without leaving a residue. In particular, a tab for pulling the adhesive film out of the bond join should not be necessary. Non-destructive separation of the bond partners should likewise be possible even if the adhesive film tears during the separation process. The use of layers which only stretch slightly, or not at all, as a constituent of the adhesive films should be possible and should be utilized to produce important adhesive properties.

Accordingly, the invention relates to a piece of adhesive film as characterized in greater detail in the claims. Advantageous embodiments are described in sub-claims.

In the invention, a two-dimensional piece of double-sided self-adhesive film is partially coated with a non-adhesive material in such a way that an adhesive area on one side is always opposite a non-adhesive area on the other side. For handling during application (bonding) the adhesive areas are advantageously coated with release laminates, which simultaneously serve to protect the adhesive composition before use. The double-sided self-adhesive film can optionally have additional layers, for example interlayers of plastic films, foamed sheet-like structures, filaments, to mention but a few. The ends of the double-sided self-adhesive film can optionally be adhesive-free on both sides.

The pieces of adhesive film in this form are highly suitable for temporary bonding of a wide variety of materials, for example in the household or office. For example, posters, notices, small pictures, etc., can be bonded in a simple manner so that the adhesive film remains invisible in the bond join. Other possible applications include the temporary sealing of cartons, the temporary fixing of, for example, photographs in photo albums, to mention but a few.

Removal of the fixed object without leaving a residue is possible in a simple manner by pulling the object in the direction of the adhesive film longitudinal direction parallel to the bond plane. The separation process is intended to take place in such a way that the adhering areas separate from one another. Simple removal of the bonded object is achieved by the stretching of the double-sided self-adhesive tape starting from the centre of the adhesive film. The drop in adhesion which occurs is favoured by reducing the tack of the self-adhesive composition analogously to DE 33 31 016 and DE 42 22 849, and by reducing the adhesive film thickness, caused by the stretching of the adhesive film.

The pulling need not be carried out precisely. Neither is it necessary to pull precisely so that the adhesive areas separate from one another, since even pulling at an angle, even right angles, is successful, although less elegant. Nor is it necessary to pull precisely in the direction of the bond join. Deviations are allowed here too, although care should be taken not to damage the substrates.

In embodiments according to the invention having an intermediate support which either tears easily, such as tissue paper or a thin film, or has nominal breaking points in the area in which the adhesive film is to be pulled apart, or if highly elastic or nonelastic, but highly stretchable intermediate supports are used, detachment without leaving a residue is in particular ensured, as in the case outlined above, with adhesive films of the "strippable" type, as described, inter alia, in DE 33 31 016. However, products of the type described in WO 92/11333 can also be used correspondingly.

In these embodiments according to the invention with an adhesive film of the rather more classical type of a self-adhesive composition as widely employed for adhesive tapes, the separation of the pulled-apart parts is less easy after breaking of the bond. However, this is relatively unimportant for some applications, in particular if the residues can remain on the substrates without causing any problems. However, if in this and other cases the residues are to be more easily removable, a tab is recommended in each case to enable easier pulling on the residue. Such a tab can be designed, in particular, so that the non-adhesive areas extend around an edge of the piece of adhesive film, for example a few millimetres beyond the adhesive area beneath.

The shear loadability of the adhesive bonds produced with the novel adhesive films is determined through:

the force which must be applied to stretch the adhesive film (adhesive composition plus any intermediate support) in the longitudinal direction, in the case of slight overlapping of the non-adhesive areas, the shear strength of the adhesive film on these.

SUITABLE MATERIALS

Adhesive Films (Double-Sided Self-Adhesive Tapes)

Suitable according to the invention are conventional double-sided self-adhesive tapes, but in particular those which, after bonding, can be detached without leaving a residue by pulling in the bond plane. Suitable adhesive compositions include those based on natural rubber/resin mixtures, synthetic rubber/resin mixtures, acrylate copolymers, polyurethanes, etc., to mention but a few. Particularly suitable are adhesive films as described in DE 33 31 016, DE 42 22 849 and WO 92/11333. Typical dimensions of novel adhesive films are (width×length× thickness) from 3 mm×5 mm×25 µm to 100 mm×200 mm×3000 µm, preferably from 5 mm×10 mm×50 µm to 40 mm×80 mm×1000 µm, or even more if foamed intermediate supports are used.

Intermediate Supports

In order to adjust the shear loadability and the force necessary to separate the adhesive bond, the adhesive film may optionally contain an intermediate support. Suitable materials include, inter alia, plastic films, nonwovens, foams and filaments. The use of foamed intermediate supports additionally enables better wetting of the adhesive composition for bonding of materials with rough surfaces. Suitable tear strengths of the intermediate supports are so low that problem-free separation of the adhesive bond is possible, or alternatively a nominal breaking point is incorporated by means of the perforation, cut or the like in order to enable problem-free separation.

Non-Adhesive Areas

There is a variety of ways in which the non-adhesive areas can be produced. For example, they can be produced by rendering the adhesive composition inert by means of a non-tacky coating. Other possibilities include laminating on thin layered materials, such as plastic films and papers. If the non-adhesive areas overlap slightly, the force necessary to separate the adhesive bond can be controlled via the shear strength of the adhesive film against the non-adhesive areas and via the stretching characteristics of the non-adhesive areas. In particular, films and papers with or without a release-agent coating are used.

Release Laminate

Suitable release laminates are conventional release films and release papers, for example siliconized release films/ release papers, which are usually employed as sheet-like media with a good release action against self-adhesive compositions.

In general, reference is made to DE 33 31 016, DE 42 22 849 and WO 92/11333 regarding the production, processing and handling of the particularly preferred adhesive films.

The examples below are intended to illustrate the invention with reference to working examples, without wishing to restrict the invention unnecessarily. All parts are by weight.

EXAMPLE 1

A self-adhesive composition B comprising a mixture of 50 parts of SIS 3-block polymer having a block polystyrene content of 29% by weight (Vector 4211, Dexco), 50 parts of a pentaester of partially hydrogenated colophony (Pentalyn H-E, Hercules) and 1 part of a phenolic antiageing agent is extruded in a film thickness of 600 µm onto a double-sided siliconized 80 g/m$^2$ release paper, and the laminate comprising adhesive composition and release paper is wound up to give stock rolls 50 mm in width. In a second operation, first half of one side of the above adhesive laminate (in a width of 25 mm) is covered by a 30 µm thick, siliconized polypropylene film (siliconized side toward the adhesive composition), and the uncovered adhesive composition surface is subsequently covered with a siliconized release paper 35 mm in width in such a way that the latter extends 10 mm beyond the polypropylene film so that it can later serve as a tab for easy separation of the release film. After the lamination of the release paper siliconized on both sides, the opposite side of the adhesive film is laminated in the manner of a mirror image corresponding to the first adhesive composition side with the same polypropylene film and a corresponding siliconized release paper. Individual pieces of adhesive film are produced by means of a punch, giving pieces measuring 20 mm×50 mm.

Corresponding pieces of adhesive film are highly suitable for bonding lightweight sheet-like structures, for example posters, small pictures, etc., and for sealing cartons. In order to fix, for example, a poster, the siliconized release paper is removed from one side of the adhesive composition, and the adhesive film, with the adhesive side facing up, is fixed to the substrate which is to carry the poster. After removal of the release paper on the front, the poster can be attached. For reliable bonding, two adhesive films are used which are in the region of the upper left-hand and upper right-hand corners of the poster, becoming invisible after fixing the poster (completely covered by the poster).

In order to remove the poster without leaving a residue, it is pulled downward perpendicular to the bond plane.

EXAMPLE 2

During further processing of the stock rolls from Example 1, the non-adhesive areas are produced not using polypropylene films 25 mm in width, but instead using siliconized polypropylene release films 30 mm in width in such a way they overlap by 10 mm in each case in the centre of the release film, thus producing an adhesive-free area 10 mm in length in the centre of the adhesive film. Corresponding pieces of adhesive film are likewise highly suitable for bonding lightweight two-dimensional structures, for example posters, small pictures, etc., and for sealing cartons, for example. In contrast to Example 1, the force necessary to separate the adhesive bond and thus the shear strength achievable by the bond are additionally dependent on the shear strength of the bond between the adhesive composition and the siliconized polypropylene films in the overlap region of the latter, as well as on the stretching characteristics of the adhesive composition. The separation force required and the shear loadability of the bond are therefore increased compared with Example 1.

EXAMPLE 3

The non-adhesive covers of siliconized polypropylene film in Example 2 are replaced by covers with the same dimensions of non-siliconized, biaxially stretched polyethylene terephthalate 10 µm in thickness.

The requisite separation force is likewise increased compared with Example 1.

EXAMPLE 4

Analogously to Example 2, a water-clear, self-adhesive acrylate copolymer composition in a thickness of 1,200 µm is employed instead of the SIS-based self-adhesive composition. The acrylate copolymer composition has a tear strength of about 0.5 MPa. Corresponding pieces of adhesive film (product Scotch 4910 from 3M) are likewise highly suitable for bonding lightweight two-dimensional structures, for example posters, small pictures, etc. In contrast to the pieces of adhesive film from Example 2, they can be employed in particular, owing to the known very good ageing properties of acrylate copolymers, if maximum transparency of adhesive films (for example for bonding transparent materials) or excellent ageing behaviour, for example extreme UV stability, are important.

EXAMPLE 5

An adhesive film laminate comprising a 13 g/m$^2$ tissue paper coated on both sides in a thickness of 200 µm with the self-adhesive composition from Example 1 is processed as described in Example 1. In contrast to Example 1, the force required to separate the adhesive bond, and thus the achievable shear strength of the bond, are additionally dependent on the tear strength of the tissue paper as well as on the stretching characteristics of the adhesive composition. The separation force required is therefore increased compared with Example 1. This product has advantages during production. In particular, lifting of the adhesive composition from the stock rolls during cutting of the latter is prevented. In addition, the substrate does not interfere with the separation process since it is very easily torn.

EXAMPLE 6

An adhesive film laminate comprising a 75 µm thick polyurethane film based on a thermoplastic polyesterurethane (Platilon U01) coated on both sides in a thickness of 100 µm with the self-adhesive composition from Example 1 is processed as described in Example 1. In contrast with Example 1, the force required to separate the adhesive bond, and thus the achievable shear strength of the bond, are additionally dependent on the force required to stretch the polyurethane films as well as on the stretching characteristics of the adhesive composition.

The separation force required is therefore increased compared to Example 1.

EXAMPLE 7

Pieces of adhesive film comprising a 3000 µm thick EPDM foam having a density of 65 kg/m$^3$ and an adhesive coating with the self-adhesive composition described in Example 1 on both sides in a thickness of 200 µm each are produced by cutting completely through the foam in the centre of the adhesive film.

Corresponding films are particularly suitable for the bonding of materials having rough surfaces and/or for bonding to rough substrates, since the use of the foam significantly increases the deformability of the adhesive film perpendicular to the film plane, which means that the surface wetting on rough surfaces and thus the bond strength are significantly increased.

EXAMPLE 8

An adhesive film corresponding to Example 2, but with an adhesive layer only 75 g/m$^2$ thick and with siliconized polypropylene release films 35 mm in length, where 5 mm of the release films are folded around the adhesive film at each end of the adhesive films and thus form tabs, is likewise highly suitable for the bonding of posters. During rapid separation of the adhesive bond, the adhesive laminate tears due to the insufficiently high tear strength. Removal of residues of adhesive film from the substrate and previously bonded article without leaving a residue is nevertheless possible if the siliconized polypropylene release films are folded up and the adhesive film parts are removed by slow pulling parallel to the bond plane.

EXAMPLE 9

As an alternative to Example 1, an adhesive film of corresponding structure, but having the dimensions 5 mm×10 mm×100 µm (width×length×thickness) and non-adhesive covers measuring 5 mm×5 mm of siliconized polypropylene release film with a thickness of 30 µm, is produced. The corresponding material is highly suitable for the reversible bonding of photographs in photo albums.

I claim:

1. An adhesive element for a temporary bond, comprising
   a) a piece of stretchable film carrying adhesive on both faces,
   b) means rendering one adhesive area on each face non-adhesive, the resulting non-adhesive area on one face being aligned with the adhesive area on the other face to provide a stretchable film having one adhesive area and one non-adhesive area per face,
   c) the adhesive being such that upon stretching in its plane it loses adhesiveness,
   d) whereby upon joining two surfaces by applying one face of the element to one surface and applying the other surface to the other face of the element they are joined and subsequently by moving one of the surfaces laterally the adhesive stretches, loses its adhesiveness and the surfaces are released from one another and from the element
wherein said element has a thickness of about 25 to 3000 µm.

2. An element according to claim 1, wherein the adhesion of the film is lower than its cohesion, the adhesion disappearing during stretching, the ratio between separation force and tear strength being at least 1:1.5.

3. An element according to claim 1, wherein the film comprises a mixture of thermoplastic rubber and a tackifying resin, and has higher elasticity than plasticity.

4. An element according to claim 1, wherein the non-adhesive areas constitute adhesive areas coated or covered with a material which shields their adhesiveness.

5. An element according to claim 4, wherein the non-adhesive areas carry a paper or plastic applique to shield their adhesiveness.

6. An element according to claim 1, further carrying a release paper on at least one surface for initial protection prior to use.

7. An element according to claim 6, wherein the release paper includes a tab for separation of the release paper from the balance of the element.

8. An element according to claim 1, further including
   d) a support for the film, the support being provided with a transverse tear line, whereby upon stretching to effect separation the support first tears along the tear line.

9. An element according to claim 1, wherein the adhesive bond is of such a kind that the piece of adhesive film is totally within the region of the bond joint and thus invisible.

10. Two articles releasably bonded to one another by an element according to claim 1, each article being bonded to a different adhesive area of the element.

\* \* \* \* \*